United States Patent [19]

Miura et al.

[11] Patent Number: 4,959,338
[45] Date of Patent: Sep. 25, 1990

[54] HEAT-RESISTANT CATALYST CARRIER MOLDINGS AND CATALYSTS FOR COMBUSTION

[75] Inventors: Tadashi Miura; Takuji Itoh; Masaaki Kadono; Masakichi Shimada, all of Ooi, Japan

[73] Assignee: Toa Nenryo Kogyo Kabushiki Kaisha, Tokyo, Japan

[21] Appl. No.: 278,138

[22] Filed: Nov. 30, 1988

[30] Foreign Application Priority Data

| Aug. 17, 1988 | [JP] | Japan | 63-204124 |
| Sep. 10, 1988 | [JP] | Japan | 63-227277 |
| Sep. 12, 1988 | [JP] | Japan | 63-227675 |

[51] Int. Cl.$^5$ .............................. B01J 21/12
[52] U.S. Cl. ...................... 502/263; 502/238
[58] Field of Search .................. 502/263, 238

[56] References Cited

U.S. PATENT DOCUMENTS

| 4,174,301 | 11/1979 | Choca et al. | 502/263 |
| 4,399,057 | 8/1983 | Hensley, Jr. et al. | 502/263 |
| 4,497,909 | 2/1985 | Itoh et al. | 502/263 |
| 4,631,268 | 12/1986 | Lachman et al. | |
| 4,631,269 | 12/1986 | Lachman et al. | |
| 4,778,779 | 10/1988 | Murrell et al. | 502/263 |

*Primary Examiner*—Carl F. Dees
*Attorney, Agent, or Firm*—Armstrong, Nikaido Marmelstein, Kubovcik & Murray

[57] ABSTRACT

The present invention relates to a heat-resistant catalyst carrier and a catalyst carrier molding comprising silica and alumina, in which a silica content is in a range of 2% by weight to 30% by weight, and an overall pore volume is at least 0.3 ml/g and a volume of pores having a diameter of 100 Å or larger accounts for at least 60% of the overall pore volume, or which have a specific surface area of at least 20 m$^2$/g after firing at 1200° C. in air, or which show a peak area at $-110$ ppm to $-130$ ppm which is 0 to 10% with respect to a peak area at $-50$ ppm to $-130$ ppm, as measured by the nuclear magnetic resonance ($^{29}$Si-NMR) method using silicone rubber ($-21.9$ ppm) as a reference peak after firing at 500° C. in air, and is also concerned with a catalyst for combustion comprising the same. The catalyst carriers and moldings can retain large pore volume and specific surface area even upon held under high-temperature and —humidity conditions over an extended period of time, while the catalysts for combustion can retain high reactivity with reduced or limited deactivation.

14 Claims, 6 Drawing Sheets

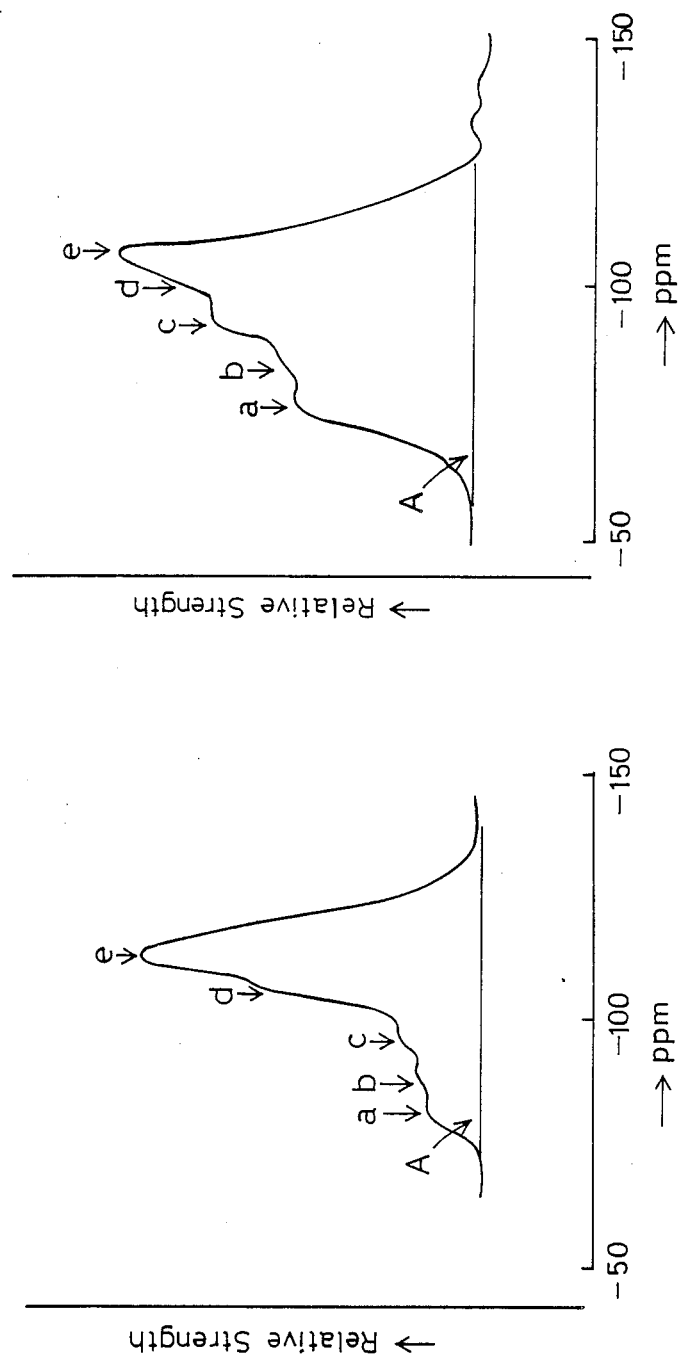

HEAT-RESISTANT CATALYST CARRIER MOLDINGS AND CATALYSTS FOR COMBUSTION

BACKGROUND OF THE INVENTION

For carriers or supports for catalysts used under high-temperature and -humidity conditions, for instance, catalysts for high-temperature combustion such as catalysts for combustion used with gas turbines, kerosine and gas heaters, petroleum and gas hot water-supply equipment, heavy oil combustion equipment and reformers for fuel cells, catalysts for steam reformers and catalysts for the purification of odors and exhaust gases, cordierite ($2MgO-2Al_2O_3-5SiO_2$), mullite ($3Al_2O_3-2SiO_2$) and the like have heretofore been used as ceramic substrates. However, they are coated on their surfaces with a porous material for use, since they are of no porosity. As the porous material, use is generally made of alumina, which carries thereon a catalytically active metal component and is used as a catalyst. However, a problem with alumina is that when used under high-temperature conditions, alumina is transformed into $\alpha$-alumina, which is so decreased in specific surface area that the active metal component becomes poor in dispersibility and is rapidly deactivated.

It has also been reported that lanthanum $\beta$-alumina ($LaO_3-11Al_2O_3$) and barium alumina ($BaO-6Al_2O_3$) are of high heat resistance (see Japanese Patent Laid-Open Publication No. 62-153158). However, they offer problems that their specific surface areas after high-temperature firing or calcination are less than satisfactory, and their commercial or industrial use incurs cost rises due to an increase in the amount of a noble metal to be used as a catalyst component.

Further, it has been reported that an aqueous solution of a mixture of an alumina hydrate with colloidal silica is thickened and gelled by the addition of a basic compound, and the resulting gel is dried and aged into a heat-resistant silica-alumina base catalyst carrier composition (see Japanese Patent Laid-Open Publication No. 61-287446). Still further, there has been a report on a monolithic catalyst support comprising a structural phase of a sintered ceramic material and a high surface area support phase of a porous inorganic oxide integral with the structural phase, wherein said porous inorganic oxide support phase consists essentially of 50% by weight to 93% by weight of alumina and 7% by weight to 50% by weight of silica. However, a problem common to these compositions is that when used at high temperatures for an extended period of time, their specific surface areas are sharply decreased. Another problem with said monolithic catalyst support is that even when it is intended to enhance a coating layer for, e.g., a honeycomb structure, it is difficult to form a uniform and thick coating layer within close cells of honeycomb.

SUMMARY OF THE INVENTION

The present invention relates to a catalyst carrier which comprises a silica-alumina composition, retains a large specific surface area upon held under high-temperature and -humidity conditions for an extended period of time and is resistant to impurities poisoning and a catalyst for combustion making use of such a catalyst carrier.

To this end, the present invention provides a catalyst carrier comprising silica and alumina, wherein a silica content is in a range of 2% by weight to 30% by weight, and an overall pore volume is at least 0.3 ml/g and a volume of pores having a diameter of 100 Å or larger is at least 60% with respect to the overall pore volume as determined by the measurement of a pore distribution according to the nitrogen absorption method, and a specific surface area after sintered at 1200° C. in air is at least 20 m$^2$/g, and a catalyst for combustion comprising such a catalyst carrier and a catalytically active metal component.

Preferably, the present invention provides a catalyst carrier wherein a volume of pores having a diameter of 100 Å to 400 Å in the pore distribution is at least 0.20 ml/g, and a catalyst for combustion comprising such a catalyst carrier and a catalytically active metal component.

The above catalyst carrier and catalyst are obtained as a result of finding a high surface area inorganic oxide capable of retaining pore volume and specific surface area even upon subjected to high-temperature firing and reactions, said catalyst being found to show reactivity for the combustion of combustible components over an extended period of time. In catalytic reactions, the activity, life, selectivity or economy of the catalysts used are strikingly affected by whether the catalyst carriers used are good or bad. Thus, the catalyst carriers are desired to have a suitable pore volume. In other words, it is believed that an increase in pore diameter gives rise to an increase in the rate of inward and outward diffusion of reactants and reaction products, i.e., catalyst particles, resulting in improvements in catalytic activity. Further, since the reactions proceed on the catalyst surface, the surface area should not be reduced to the utmost; it is required that the mutual correlation between both physical properties lay in a specific range.

The present inventors have found that silica-alumina compositions having small pores are more easily sintered and tend to lose more easily their pores upon subjected to firing, as compared with silica-alumina ones having large pores. More exactly, when a silica-alumina composition carrier having small pores is fired at a low temperature to carry thereon with a catalytically active metal component and used at a high temperature, a part of the active metal component is sintered into the carrier, leading to a decrease in the proportion of the active metal component. Even when the carrier is fired at a high temperature to carry thereon with a catalytically active metal component and used at a high temperature, on the other hand, the active metal component tends to coalesce because of the specific surface area of the carrier being already reduced, again leading to a decrease in the proportion of the active metal. If the carrier is used for an oxidation reaction accompanied by diffusion control, it is then required to improve an effect upon free diffusion of molecules taking part in the reaction involved. To this end, it is desired to use a carrier having relatively large pores, each of a large volume.

Another object of the present invention is to provide a catalyst carrier comprising a silica-alumina composition, wherein the coalescence of silica is suppressed even retained under high-temperature and -humiditiy conditions over an extended period of time and a silica phase bonded to alumina is homogenized, whereby said composition is permitted to have a large specific surface area, and a catalyst for combustion.

In order to achieve this object, the present invention provides a catalyst carrier comprising silica and alumina, wherein a silica content is in a range of 2% by weight to 30% by weight, and an overall pore volume is at least 0.3 ml/g and a volume of pores having a diameter of 100 Å or larger is at least 60% with respect to the overall pore volume as determined by the measurement of a pore distribution according to the nitrogen absorption method, and wherein when measured by the nuclear magnetic resonance ($^{29}$Si-NMR) method using silicone rubber (−21.9 ppm) as the reference peak, a peak area at −50 ppm to −80 ppm is 0 to 25% with respect to a peak area at −50 ppm to −130 ppm and a peak area at −110 ppm to −130 ppm is 0 to 10% with respect to a peak area at −50 ppm to −130 ppm, and a catalyst for combustion comprising such a catalyst carrier and a catalytically active metal component.

More preferably, the present invention provides a catalyst carrier of the aforesaid type wherein, when measured by the nuclear magnetic resonance ($^{29}$Si-NMR) method, a peak area at −110 ppm to −130 ppm is 0 to 10% with respect to a peak area at −50 ppm to −130 ppm and a peak area at −50 ppm to −80 ppm is 0 to 25% with respect to a peak area at −50 ppm to −130 ppm, and a catalyst for combustion comprising such a catalyst carrier and a catalytically active metal component.

Thus, the catalyst carrier and catalyst of the present invention are found to be able to provide a heat-resistant inorganic oxide composition wherein the coalescence of silica is suppressed even upon retained under high-temperature and -humidity conditions over an extended period of time and a silica phase bonded to alumina is homogenized, whereby said composition is allowed to have a large specific surface area. Said catalyst is desirous in that it can exhibit reactivity over an extended period of time.

Referring to this catalyst carrier, the peak area at −110 ppm to −130 ppm exceeds 10% with respect to the peak area at −50 ppm to −130 ppm, as measured by the $^{29}$Si-NMR method using silicone rubber (−21.9 ppm) as the reference peak. In this case, since silica is not well dispersed on alumina, as typically illustrated in FIG. 6 to be mentioned later, the composition becomes poor in heat resistance. Although any detailed reason for this is not clarified, it is considered from the observation of a product obtained by mere mixing, not reaction, of silica with alumina that when silica is not dispersed on alumina whatsoever, alumina crystals are transformed into an α-phase, thus resulting in a reduction in specific surface area and hence heat resistance. When the peak area at −50 ppm to −80 ppm exceeds 25% with respect to the peak area at −50 ppm to −130 ppm, as typically illustrated in FIG.4 to be mentioned later, silica is more highly dispersed on alumina than required, so that the composition becomes poor in heat resistance.

Any detailed reason for this is not clarified. In the case of a silica-alumina composition comprising an alumina source containing 2% by weight to 30% by weight of silica, however, silica is very uniformly and highly dispersed on alumina, since four Al atoms are generally bonded to one SiO. In such a case, the resulting composition is improved in heat resistance over a composition in which silica is not entirely dispersed on alumina; however, that composition is considered to be so unstable that a large phase change takes place, when silica-alumina is changed to mullite ($3Al_2O_3 \cdot 2SiO_2$) during firing. Therefore, in order to produce the catalyst carriers wherein the peak area at −110 ppm to −130 ppm is 0 to 10% with respect to the peak area at −50 ppm to −130 ppm and the peak area at −50 ppm to −80 ppm is 0 to 25% with respect to the peak area at −50 ppm to −130 ppm, as measured by the nuclear magnetic resonance ($^{29}$Si-NMR) method, silica is deposited onto alumina hydrogel after precipitation. Then, an aging agent such as a hydroxycarboxylic acid or its salt is added to the product with pH control, thereby obtaining a high heat-resistant composition in which silica is dispersed on alumina in a suitably uniform manner. It is believed that such suitably uniform dispersion of silica on alumina causes the composition to be so stabilized that no appreciable phase change takes place when silica-alumina is changed to mullite ($3Al_2O_3 \cdot 2SiO_2$) during firing, thus resulting in an increase in heat resistance.

A further object of the present invention is to provide a catalyst carrier molded body (hereinafter called the molding) or molded body formed of said carriers, which can retain large pore volume and specific surface area even upon held at high temperature and humidity over an extended period of time and is resistant to impurities poisoning, and a catalyst for combustion comprising such a catalyst carrier molding and an active-metal component.

To this end, the present invention provides a catalyst carrier molding wherein a high surface area carrier inorganic oxide comprises silica and alumina, a silica content ranges from 2% by weight to 30% by weight, and an overall pore volume is 0.3 ml/g or larger and a volume of pores having a diameter of 100 Å or larger accounts for 60% or larger of the overall pore volume, as determined by the measurement of a pore distribution according to the nitrogen absorption method, and a catalyst for combustion comprising such a catalyst carrier molding and an catalytically active metal component, or a catalyst carrier molding wherein a catalyst carrier molding comprising a high surface area inorganic oxide is used as a substrate and a high surface area catalyst carrier layer is further formed on said substrate, and a catalyst for combustion comprising such a catalyst carrier molding and a catalytically active metal component, and further a catalyst carrier molding comprising sintered ceramics and a high surface area inorganic oxide, in which said sintered ceramics are uniformly dispered into said high surface area inorganic oxide, and a catalyst for combustion comprising such a catalyst carrier molding and a catalytically active metal component, or a catalyst carrier molding wherein a sintered ceramic molding is used as a substrate and a catalyst carrier layer comprising a high surface area inorganic oxide is formed on said substrate, and a catalyst for combustion comprising such a catalyst carrier molding and a catalytically active metal component.

The catalyst carrier moldings and catalysts for combustion according to the present invention are molded in the manner as mentioned above, whereby the catalyst carriers can retain high pore volume and specific surface area even when they are used under high-temperature and -humidity conditions over an extended period of time, while the catalysts can retain high reactivity with reduced or limited deactivation.

BRIEF DESCRIPTION OF THE DRAWINGS

FIG. 6 is a nuclear magnetic resonance diagram, as measured, of the catalyst carrier prepared in Comparison Example 4, FIG. 7 is a nuclear magnetic resonance diagram, as measured, of the catalyst carrier prepared in Comparison Example 7.

DESCRIPTION OF THE PREFERRED EMBODIMENTS

Figure 1:
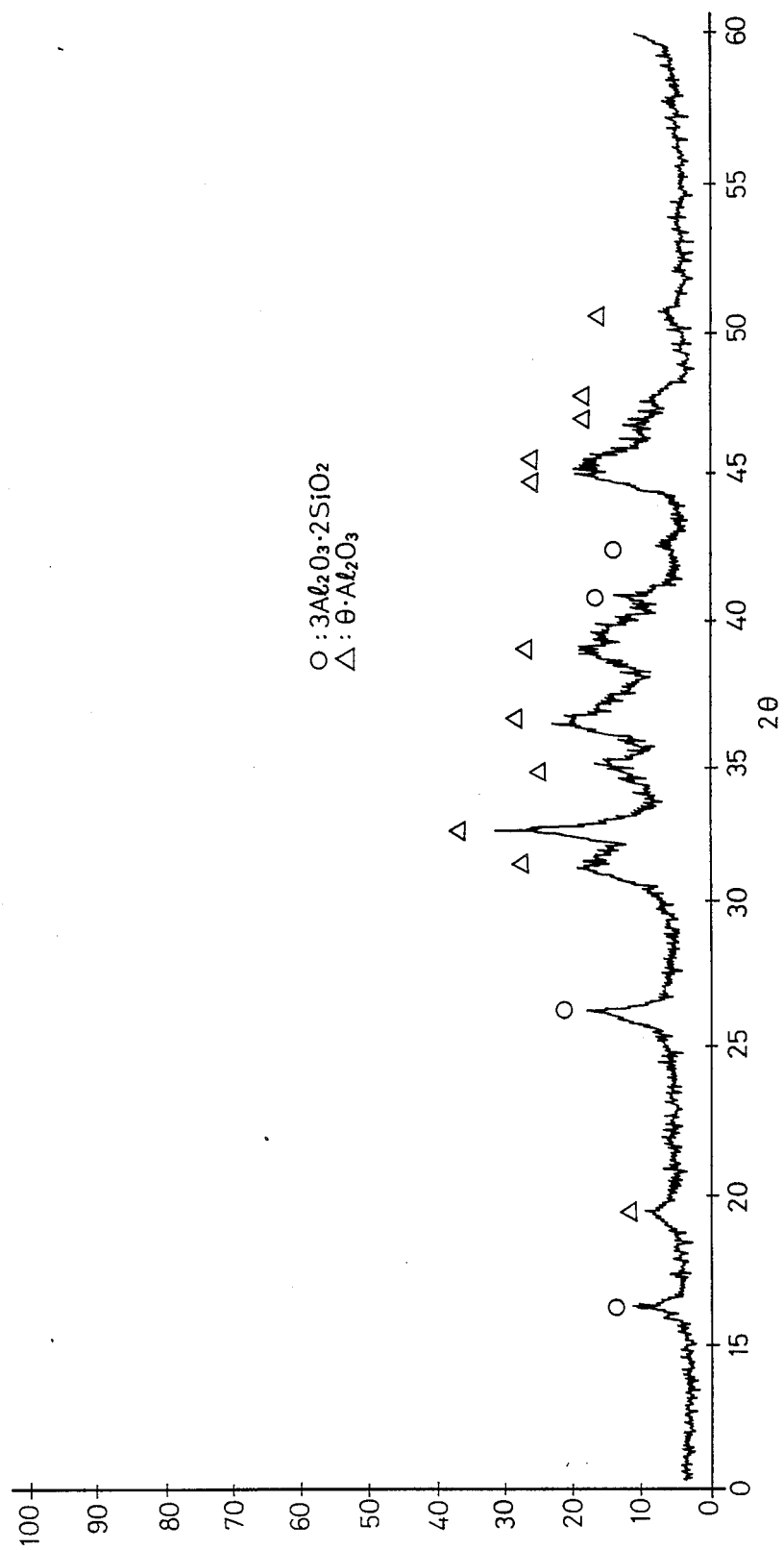
FIG. 1 is an X-ray diffraction diagram of the catalyst carrier prepared in Example 1 of the present invention.

The catalyst carriers according to the present invention will now be explained.

The catalyst carrier has a silica content ranging from 2% by weight to 30% by weight, preferably 2.5% by weight to 25% by weight. If the silica content is less than 2% by weight, then the heat-resistant inorganic porous composition according to the present invention cannot be obtained; there is an increase in the number of fine pores having a small pore diameter, which are to be destroyed by high-temperature firing, resulting in a lowering of the overall pore volume. If the silica content exceeds 30% by weight, on the other hand, there is then an increase in the componential ratio of mullite, which again results in a lowering of the overall pore volume and hence reactivity.

A preferred overall pore volume is from 0.4 ml/g to 1.5 ml/g inclusive, particularly 1.3 ml/g or lower. A problem with an overall pore volume of 0.3 ml/g or less is that no sufficient diffusion rate of reactants and reaction products can be obtained, as will be described later. A problem with an overall pore volume exceeding 1.5 ml/g is, on the other hand, that strength cannot be retained and there is a decrease in bulk density, which is accompanied by a reduction in the input weight fed to a reactor. More preferably, a volume of pores having a diameter ranging from 100 Å to 400 Å is 0.20 ml/g or more. The catalyst carrier of the present invention has a specific surface area of 20 m²/g or larger after fired at 1200° C. in air, but should preferably have a specific surface area of at least 50 m²/g, particularly at least 70 m²/g.

In the production of the catalyst carriers according to the present invention, a colloidal gel of each of the components thereof is first prepared, and is then subjected to aging, drying, molding and/or firing steps. In the process of such production, however, the aging operation produces a remarkable influence upon the physical and chemical properties, i.e., the pore structure and silica dispersibility, of products.

The method for preparing the catalyst carrier compositions according to the present invention preverably involves the steps of:

(1) forming of alumina hydrogel,
(2) silica coating, and
(3) aging of alumina-silica crystals.

The starting material to be used in the step of forming the alumina hydrogel may include an inorganic salt such as sulfates, nitrates and chlorides of aluminum and a soluble aluminium salt such as alkaline metal aluminates.

Th alumina source may preferably be used in an aqueous state, and its soluble salt concentration may be in a range of about 0.1 mole to 4.0 moles, preferably about 0.3 moles to 2.0 moles. A basic compound such as ammonia water is added to the aqueous salt solution to form the alumina hydrogel.

In this step of forming the alumina hydrogel, it is essentially important to form as much reduced alumina hydrogel particles as possible. If a large alumina hydrogel is formed, its central alumina is then converted to α-alumina when subjected to high-temperature firing, thus giving rise to a reduced specific surface area. For that reason, the pH in this forming step is of importance, and may be 8 or higher or otherwise 6 or lower. In a pH range of 6 to 8, the solubility of the alumina hydrogel is too increased to form large crystals.

Then, the alumina hydrogel is transferred to the silica coating step.

In this silica coating step, an aqueous solution (having a soluble salt concentration ranging from about 0.1 to 10 moles, preferably about 0.3 to 5.0 moles) of an alkaline metal silicate (preferably, $Na_2O:SiO_2 = 1:2$ to 1:4) is used and added dropwise to the alumina hydrogel formed in the aforesaid alumina hydrogel forming step, followed by its well dispersion for coating. In the co-precipitation of alumina and silica in the same pH range, alumina may be formed and grow on silica acting as a nucleus. However, such cases are unpreferred, since alumina grows in the aging step to be described later and, in the growth process, it is converted to α-alumina.

The thus formed silica-alumina crystals are transferred to the aging step.

The purpose of this aging step is to dissolve small crystals, thereby developing them into crystals of uniform size. In this step, the silica-alumina crystals formed in the aforesaid coating step are subjected to crystal growth as formed. However, when the aging step is carried out in the vicinity of pH 8, the silica-alumina crystals may be rearranged into silica-alumina crystals having alumina-coated layers. It has been found, however, that it is preferred to bring the pH down to 6.0 in the aging step for the purpose of effecting the growth of the silica-alumina crystals as formed. By doing so, it is possible to suppress the rearrangement of the silica-alumina crystals and grow the silica-alumina crystals of small diameter in the as-formed state but with increases in the pore volume. The aging step is carried out at 40° C. to 90° C., preferably 50° C. to 80° C. for 1 hour to 5 hours, preferably 1.5 hours to 3 hours.

If the silica-alumina crystals of small diameter are fired in the as-formed state without carrying out such an aging step, then the alumina is sintered by firing because of alumina's small pore diameter, resulting a lowering of heat resistance. Thus, it is possible to obtain a composition having a large pore diameter by increasing the pore diameter of the crystals in the aging step.

The silica-alumina crystals developed in the aging step are filtered out, then washed with an aqueous solution of ammonium carbonate, chloride and nitrate, and are thereafter dried in air at 80° C. to 200° C., preferably 90° C. to 150° C.

After drying, the silica-alumina compositions may be fired in air at 400° C. to 1400° C., preferably 500° C. to 1200° C. into the catalyst carriers according to the present invention.

It is considered that by preparing the silica-alumina compositions by the preparatory method as mentioned above, the alumina hydrogel is coated with silica, whereby porous θ-alumina is stabilized to suppress its conversion to α-alumina. On the other hand, mullite that is a composite material of alumina with silica is formed by the addition of silica to give rise to a reduced specific surface area. By optimizing the amount of silica to be added to control the growth of the silica-alumina crystals, however, it appears to be feasible to suppress the conversion of θ-alumina to α-alumina, aquire pores due to the stabilization of θ-alumina and aquire specific surface areas at high temperatures.

According to the present invention, there can also be provided a further improved catalyst carrier of the aforesaid silica-alumina compositions comprising silica and alumina, wherein a silica content is in a range of 2% by weight to 30% by weight, and an overall pore volume is at least 0.3 ml/g and a volume of pores having a diameter of 100 Å or larger is at least 60% with respect to the overall pore volume as determined by the measurement of a pore distribution according to the nitrogen absorption method, and wherein when measured by the nuclear magnetic resonance ($^{29}$Si-NMR) method using silicone rubber (−21.9 ppm) as the reference peak, a peak area at −110 ppm to −130 ppm is 0 to 10% with respect to −50 ppm to −130 ppm, a peak area at −110 ppm to −130 ppm is 0 to 10% with respect to a peak area at −50 ppm to −130 ppm and a peak area at −50 ppm to −80 ppm is 0 to 25% with respect to a peak area at −50 ppm to −130 ppm.

In general, the bond states of silica with alumina in alumina-silica compositions are expressed by:

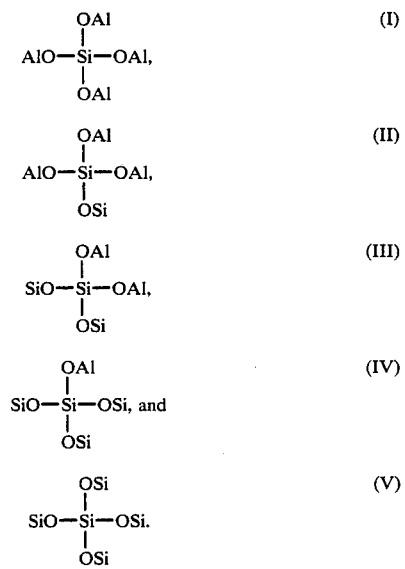

According to the $^{29}$Si-NMR measurement of such silica-alumina compositions wherein silicone rubber (−21.9 ppm) is used as the reference peak, the structures expressed by the above formulas (I) to (IV) have their absorption peaks located at −80 ppm, −88 ppm, −97 ppm and −105 ppm, respectively. It is here to be noted that the structure (V) having no aluminium substituent finds its absorption peak at −111 ppm.

Figure 8:
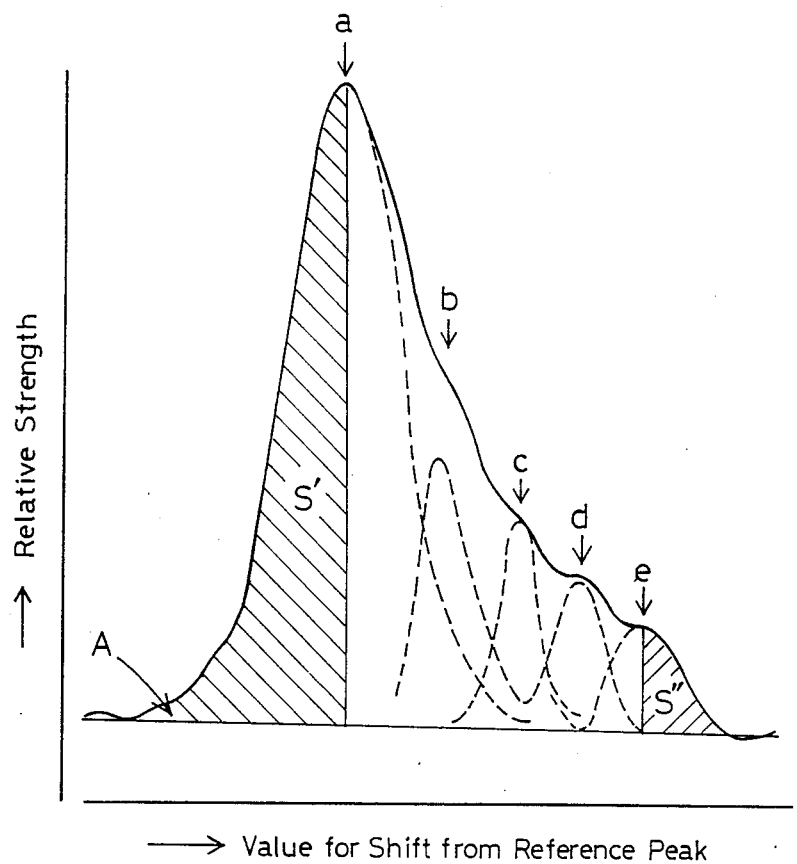
FIG. 8 is a diagram for illustrating a nuclear magnetic resonance diagram as measured.

FIG. 8 is a diagram for illustrating the results of the $^{29}$Si-NMR measurement of a silica-alumina composition with values for shifts from the reference peak as abscissa and relative absorption strength as ordinate.

In FIG. 8, the peak positions of said formulas (I) to (V) are indicated at a to e. As shown by dotted lines, the curves for the bonding states illustrated by said formulas (I) to (V) show a moderate relative strength with respect to the values for shifts from the reference peak. For that reason, the results of measurement are indicated as the sum of absorption values based on the respective structures; the maximum value of the relative absorption strength of absorption curves corresponding to said formulas (II) to (IV) showing the compositions of the present invention is not clearly indicated.

By such measurement, however, the relative amount of the presence of the bond states corresponding to at least said formulas (I) and (V) can be found. As the overall relative strength curve shifts to the absorption peak position of the bond state shown by said formula (I), on the one hand, Al/Si approaches 4. As the overall relative strength curve shifts to the peak position of the bond state shown by said formula (V), on the other hand, Al/Si approaches 0 due to the dispersibility of silica and alumina going wrong.

For that reason, the second catalyst carrier of the present invention may be defined in terms of the ratio of s′ and s″ with respect to S, wherein:

S′ is the area defined by a curve section exceeding the shift value at which the Al/Si ratio is 4 and a reference line A, s″ is the area defined by a curve section of not higher than the shift value at which the Al/Si ratio is 0 and the reference line A, and S is the overall area defined by a curve and the reference line A.

It is to be noted that the $^{29}$Si-NMR method was carried out with JNM-GX 270 Model manufactured by JEOL, Ltd., and the measurement of $^{29}$Si nuclei (53.54 MHZ) was performed with the use of the CP/MAS (Cross Polarization/Magic Angle Spinning) method. Silicone rubber was used at the standard substance with the criterion being placed at −21.90 ppm.

In order to produce the silica-alumina compositions capable of forming such catalyst carriers, the silica source is added to the alumina source in the method for preparing said silica-alumina compositions. Then, the precipitation of the alumina hydrogel is carried out at a pH equal to or higher than 8 or equal to or lower than 6. Further, the silica source is added for the deposition of silica. Afterwards, a hydroxycarboxylic acid or its salt is added as an aging agent for the hydrogel, and aging is carried out while bringing the pH down to 6 to obtain the silica-alumina compositions.

As the hydroxycarboxylic acids or their salts usable to this end, use may be made of, for instance, tartaric acid, citric acid or other hydroxyl group-containing polyvalent carboxylic acids and their alkaline metal salts, aminodicarboxylic acids or their salts such as glutamic acid or aspartic acid, or other amino group-containing polyvalent carboxylic acids and their alkaline metal salts. These compounds may be added to the aluminium compound in a range of 0.0002 moles to 0.1 mole per mole.

In the process of producing the silica-alumina compositions, the hydroxycarboxylic acid or its salt is added and the pH is brought down to 6 at the aging step, thereby controlling the s'/s to 0 to 25% simultaneously with stable regulation of the s''/s to 0 to 10%.

Without recourse to any aging agent, there may be an increasing in the s'/s due to insufficient dispersibility of silica. In such a case, it may be impossible to produce the catalyst carriers wherein the peak area at −50 ppm to −80 ppm is 0 to 25% with respect to the peak area at −50 ppm to −130 ppm, as measured by the nuclear magnetic resonance ($^{29}$Si-NMR) method using silicone rubber as the reference peak. In the process of producing the silica-alumina compositions, however, the s'/s and s''/s can be stably controlled to 0 to 25% and 0 to 10%, respectively, while controlling the pore distribution, by effecting the precipitation of the alumina hydrogel at pH 8, adding the silica source and carrying out the aging step by the addition of ammonium tartrate (used at a ratio of 0.01 mole per mole of alumina, while bringing the pH down to 6. In this manner, it is possible to produce the silica-alumina compositions wherein the peak area at −110 ppm to −130 ppm is 0 to 10% with respect to the peak area at −50 ppm to −130 ppm and the peak area at −50 ppm to −80 ppm is 0 to 25% with respect to the peak area at −50 ppm to −130 ppm, as measured by the nuclear magnetic resonance ($^{29}$Si-NMR) method using silicone rubber as the reference peak.

Reference will now be made to the shape of the catalyst carriers of the present invention. That is, the silica-alumina compositions obtained in the aforesaid preparation method are collected by filtration, dried and pulverized, if required, and are then added with water through or not through firing, followed by humidity conditioning and mixing. Alternatively, the precipitates (hydrogel) may be mixed together. Although moldings will be explained in detail with reference to the catalyst carrier moldings to be described later, the resulting mixture is extruded through an extruder into, e.g., an extrudate or a honeycomb or particulate shape, which is then fired in air at 400° C., to 1400° C., preferably 500° C. to 1200° C. For catalysts for the purification of automotive exhaust gases, firing may be carried out at 550° C. to 1000° C. On the other hand, when preparing a catalyst for combustion by the application of wash coating on a support such as mullite, silica alumina, cordierite or honeycomb, said support is immersed in a suspension comprising a mixture of the aforesaid powders with an acid (such as acetic acid, nitric acid or hydrochloric acid) or a base (such as ammonium hydroxide) and/or hydrogel added thereto. After excessive deposits have been purged by an inert gas (such as nitrogen), the support is dried and fired. Drying is carried out in air at a temperature ranging from 80° C. to 200° C., preferably 90° C. to 150° C., and firing is performed by heating in air at a temperature ranging from 400° C. to 1400° C., preferably 500° C. to 1200° C.

When forming the catalyst carriers of the present invention into catalyst carriers for the purification of automotive exhaust gases, at least one metal component selected from the group of metals of Periodic Table of Elements, Group VIII such as, for instance, a ferrous metal component such as iron, nickel and cobalt and noble metals such as platinum, palladium, iridium, rhodium, ruthenium and osmium is carried thereon as a catalytically active metal component. In addition to the metal components of Group VIII, metal components of Group V such as vanadium and metal components of Group VI such as chromium, etc. may be ued as the catalytically active metal components. Preferable active metal components are at least one selected from the group consisting of platinum, rhodium and iridium. These active metal components in the form of oxides are carried on the carriers in an catalytically effective amount, which is preferably in a range of 0.001% by weight to 5% by weight, particularly 0.005% by weight to 2% by weight.

To and for the compositions of the present invention, one or two or more oxides of an alkaline earth metal such as barium, calcium, strontium, zirconium and magnesium, a metal of Periodic Table of Elements, Group III such as boron, scandium and yttrium, a metal of Periodic Table of Elements, Group IV such as titanium, zirconium and hafnium and a rare earth metal such as lanthanum, cerium and thorium may be added and used in an amount ranging from 0.01% by weight to 30% by weight, preferably 0.05% by weight to 10% by weight. Although the method for their addition is not critical, they may suitably be co-precipitated simultaneously with the precipitation of alumina or silica.

According to the present invention, the pore volume, pore distribution and specific surface area of the catalyst carriers as well as the characteristic values thereof, as measured by the nuclear magnetic resonance method, are not affected even by the carrying of catalystically active metal components. Thus, the obtained catalysts are identical with the carriers in such properties and characteristics.

The examples of the catalyst carriers and catalysts for combustion of the present invention will now be explained with reference to the comparison examples.

EXAMPLE 1

Prepared were 0.15 moles of an aqueous aluminium sulfate solution, which was in turn regulated to pH 8 by the addition of 1N ammonia water. Then, an aqueous solution of No. 3 water glass (JISK-1408) was added to the resulting solution in such a way that the silica content of the product amounted to 10% by weight, thereby forming silica/alumina precipitates.

The thus formed precipitates were aged at 60° C. for three hours, and the final pH was brought down to 6.2. After aging, the precipitates were filtered out and washed with water. The product was then dried at 120° C. for 12 hours in air, and fired in air at 500° C. for 3 hours, at 1000° C. for 15 hours and at 1200° C. for 15 hours to obtain three catalyst carriers.

EXAMPLE 2

Catalyst carriers were obtained in a similar manner as described in Ex. 1, except that the final pH at the time of aging was brought down to 7.5.

EXAMPLE 3

Catalyst carriers were obtained in a similar manner as described in Ex. 1, provided however that an aqueous solution of No. 3 water glass was added in such a way that the silica content of the product amounted to 5% by weight, and the final pH at the time of aging was brought down to 6.0.

EXAMPLE 4

Catalyst carriers were obtained in a similar manner as described in Ex. 1, provided however that an aqueous solution of No. 3 water glass was added in such a way that the silica content of the product amounted to 5% by weight, and the final pH at the time of aging was brought down to 7.7.

EXAMPLE 5

Prepared were 0.15 moles of an aqueous aluminium sulfate solution, which was in turn regulated to pH 8 by the addition of 1N ammonia water. Then, an aqueous solution of No. 3 water glass (JISK-1408) was added to the resulting solution in such a way that the silica content of the product amounted to 10% by weight, thereby forming silica/alumina precipitates. Further added to the precipitates were 0.0015 moles of ammonium tartrate.

The thus formed precipitates were aged at 60° C. for three hours, and the final pH was brought down to 6. After aging, the precipitates were filtered out and washed with water. The product was then dried at 120° C. for 12 hours in air, and fired in air at 500° C. for 3 hours, at 1000° C. for 15 hours and at 1200° C. for 15 hours to obtain three catalyst carriers.

COMPARISON EXAMPLE 1

An aqueous solution of aluminium sulfate was premixed with an aqueous solution of No. 3 water glass (JISK-1408) in such a way that the silica content of the product amounted to 10% by weight, and ammonia water was added to the mixed solution, while regulating the pH to 8, thereby precipitating silica and alumina at the same time. Without subjected to aging, the precipitates were filtered out of the aqueous solution, followed by water washing. Afterwards, the product was dried at 120° C. for 12 hours in air, and fired at 500° C. for 3 hours in air.

COMPARISON EXAMPLE 2

An aqueous solution of aluminium sulfate was adjusted to pH 8 by the addition of ammonia water, and an aqueous solution of No. 3 water glass (JISK-1408) was added to the solution in such a way that the silica content of the product amounted to 5% by weight, thereby forming silica/alumina precipitates which were then fired without subjected to aging in a similar manner as described Comparison Ex. 1.

COMPARISON EXAMPLE 3

Alumina powders were obtained in a similar manner as described in Comparison Ex. 1, provided however that only aluminium sulfate was used as the starting material and no silica was used, and were then fired in a similar manner as described in Comparison Ex. 1.

COMPARISON EXAMPLE 4

The alumina powders prepared in Comparison Ex. 3 were used as the starting material and mixed with commercially available silica gel powders, and the mixture was then fired in a similar manner as described in Comparison Ex. 1.

COMPARISON EXAMPLE 5

Alumina sol (manufactured by Nishio Kogyo Co., Ltd.) and colloidal silica (manufactured by Nissan Chemical Industries, Ltd.) were suspended in water and mixed together in such a way that 10% by weight of silica were contained in the final composition. While keeping the pH at 7, a silica-alumina composition was precipitated. After filtration and washing with water, the precipitates were dried at 120° C. in air for 2 hours, and were then fired at 500° C. in air for 3 hours to obtain a product fired at 500° C. Further firing at 1200° C. for 15 hours, 100 hours and 300 hours gave three products fired at 1200° C.

A catalytically active metal component may be carried on the carriers by any one of impregnation, kneading and like other methods. For operational convenience, however, the impregnation method is preferred. For the impregnation of the active metal component, a soluble compound of said metal component is prepared, and the carrier is then impregnated therewith. A concentration of the impregnating solution is in a range of about 0.005% by weight to about 0.1% by weight. Preferred for the impregnating solution is an aqueous solution. After impregnation, the carrier impregnated with the active metal component is transferred to the drying and firing steps. Drying is carried out at about 80° C. to about 200° C., and firing at about 500° C. to about 1400° C.

According to the kneading method, a solution of the active metal component is added to and incorporated into the silica-alumina composition during its precipitation.

Figure 2:
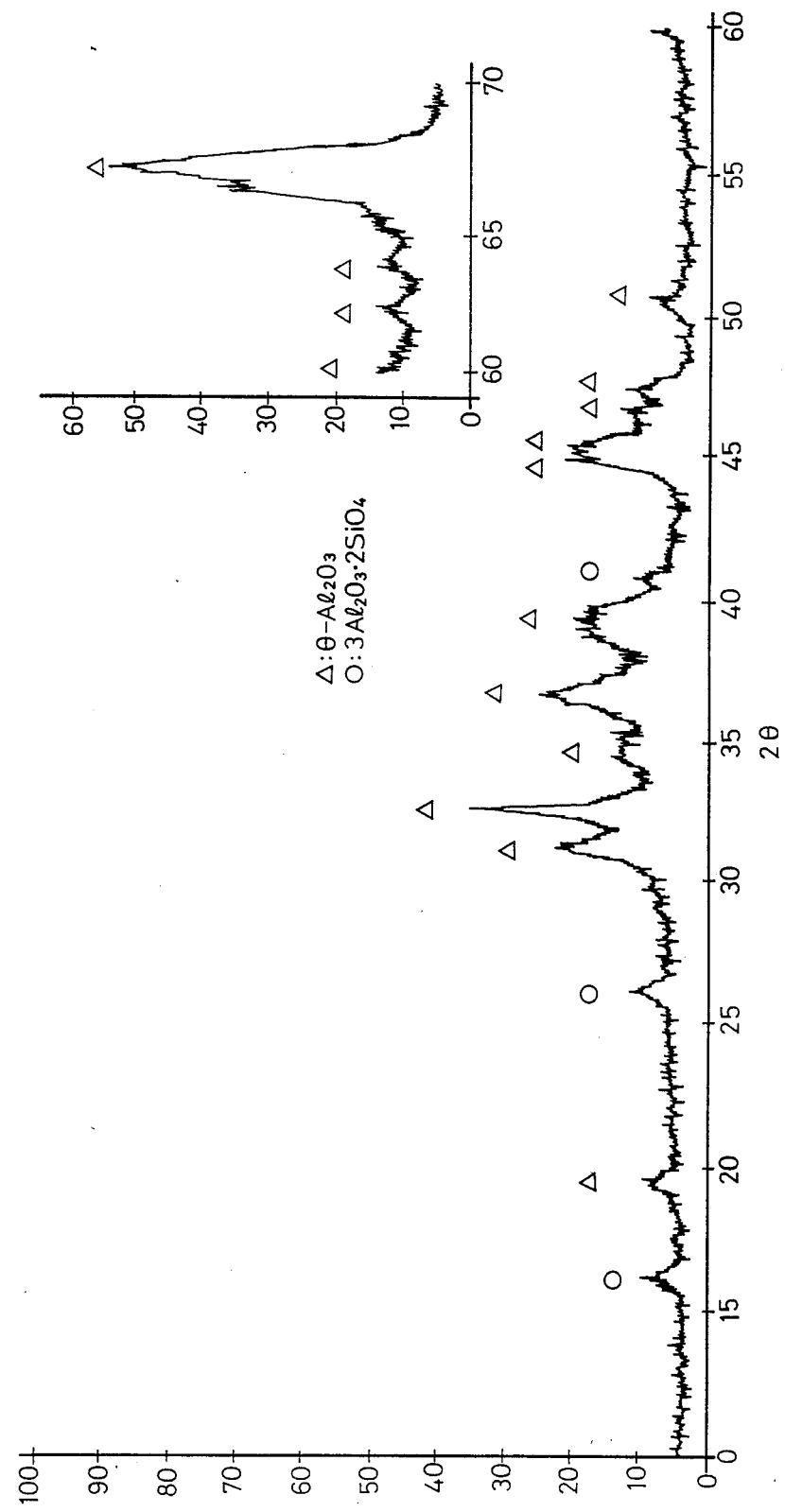
FIG. 2 is an X-ray diffraction diagram of the catalyst carrier prepared in Example 3 of the present invention.
Figure 3:
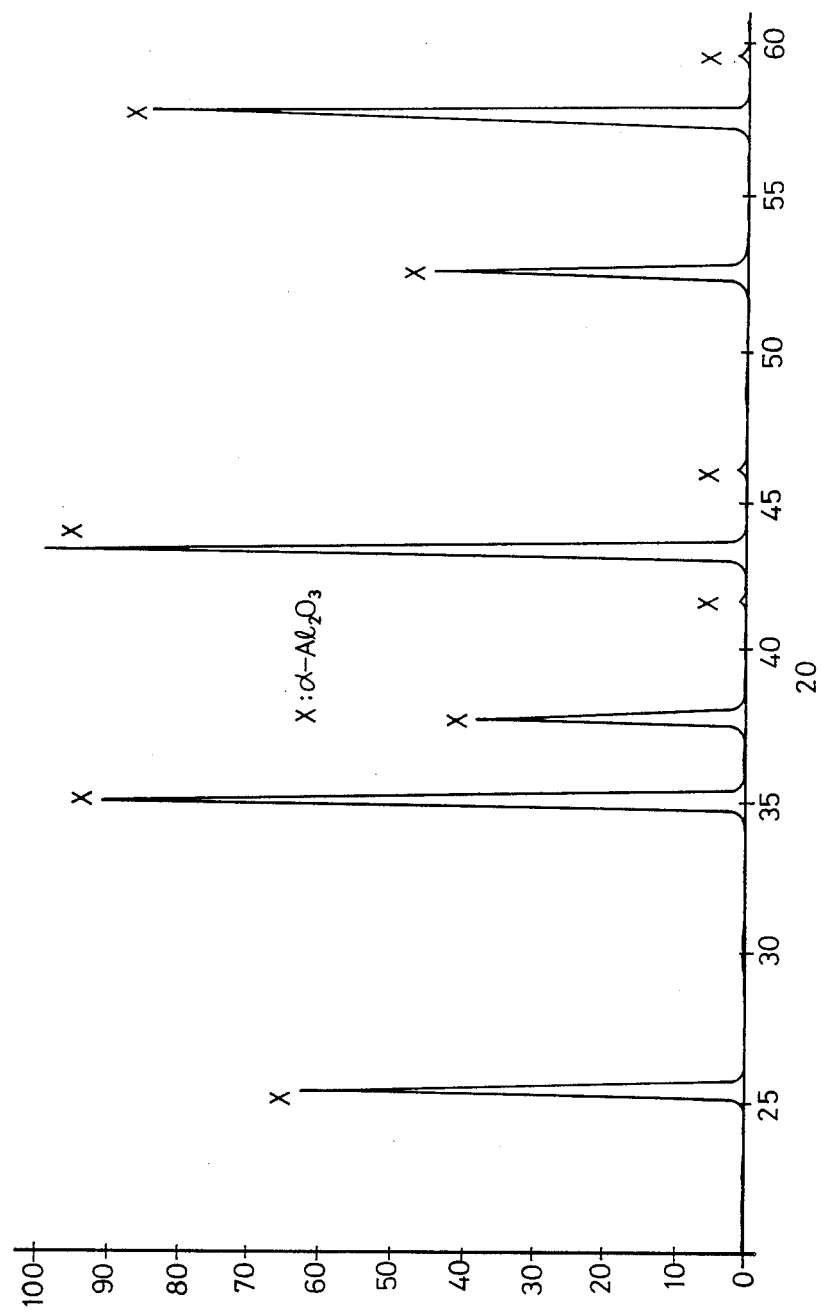
FIG. 3 is an X-ray diffraction diagram of the catalyst carrier prepared in Comparison Example 3 of the present invention.

The X-ray diffraction analysis results of the catalyst carriers obtained by firing at 1200° C. for 15 hours in Examples 1 and 3 and Comparison Example 3 are shown in FIGS. 1, 2 and 3, respectively.

As will be seen from the X-ray diffraction diagrams, the crystal structure of the silica-alumina compositions of the present invention comprises mullite ($3Al_2O_3 \cdot 2SiO_2$) and $\theta$-$Al_2O_3$, whereas that of the comparison example is converted to $\alpha$-$Al_2O_3$.

Then, the catalyst carriers obtained by firing at 500° C. for 3 hours, at 1000° C. for 15 hours and at 1200° C. for 15 hours in the above examples and comparison examples were measured in terms of the specific surface area ($m^2/g$), pore volume (ml/g) and pore distribution (%) as well as the proportion of pores having a diameter of 100Å or larger with respect to the overall pore volume and the volume (ml/g) of pores having a diameter of 100Å to 400Å. The measurement results are set forth in the following Tables 1 to 3. The results of nuclear magnetic resonance spectrometry are also shown in Table 1.

TABLE 1

| | (After firing at 500° C. for 3 hours) | | | | | | | | | |
|---|---|---|---|---|---|---|---|---|---|---|
| | Comp. Ex. 1 | Comp. Ex. 2 | Ex. 1 | Ex. 2 | Ex. 3 | Ex. 4 | Ex. 5 | Comp. Ex. 3 | Comp. Ex. 4 | Comp. Ex. 5 |
| Silica (wt %) | 10.0 | 5.0 | 10.0 | 10.0 | 5.0 | 5.0 | 10.0 | 0 | 5.0 | 10.0 |
| Alumina (wt %) | 90.0 | 95.0 | 90.0 | 90.0 | 95.0 | 95.0 | 90.0 | 100 | 95.0 | 90.0 |
| Specific Surface Area ($m^2/g$) | 449 | 208 | 308 | 299 | 230 | 225 | 308 | 208 | 230 | 200 |
| Pore Volume (ml/g) | 0.67 | 0.39 | 1.30 | 1.13 | 0.57 | 0.83 | 1.20 | 0.61 | 0.62 | 0.90 |
| Pore Distribution (%) | | | | | | | | | | |
| 0–40 Å Diameter | 12.7 | 10.3 | 2.3 | 2.4 | 0 | 0 | 0.0 | 1.2 | 5.0 | 1.4 |
| 40–60 | 22.2 | 32.3 | 6.0 | 11.5 | 3.1 | 1.5 | 4.1 | 9.9 | 10.0 | 5.1 |
| 60–80 | 16.6 | 42.4 | 4.1 | 11.3 | 11.7 | 4.6 | 6.0 | 37.3 | 35.2 | 7.5 |

TABLE 1-continued (After firing at 500° C. for 3 hours)

|  | Comp. Ex. 1 | Comp. Ex. 2 | Ex. 1 | Ex. 2 | Ex. 3 | Ex. 4 | Ex. 5 | Comp. Ex. 3 | Comp. Ex. 4 | Comp. Ex. 5 |
|---|---|---|---|---|---|---|---|---|---|---|
| 80–100 | 9.8 | 4.2 | 5.1 | 11.3 | 16.5 | 4.8 | 7.4 | 37.5 | 38.1 | 9.6 |
| 100–200 | 20.4 | 4.9 | 41.2 | 36.2 | 49.2 | 28.6 | 41.9 | 8.4 | 9.0 | 42.4 |
| 200–400 | 11.0 | 3.1 | 39.7 | 19.9 | 12.9 | 40.1 | 39.0 | 1.7 | 2.2 | 20.6 |
| 400 or larger | 7.3 | 2.8 | 1.6 | 7.5 | 6.7 | 20.4 | 1.6 | 3.9 | 4.5 | 13.4 |
| Volume of 100 Å or larger Diameter Pores / Overall Pore Volume | 38.7 | 10.8 | 82.5 | 63.6 | 68.8 | 89.1 | 82.5 | 14.0 | 15.7 | 76.4 |
| Volume of 100–400 Å Diameter Pores | 0.21 | 0.03 | 1.05 | 0.63 | 0.35 | 0.57 | 0.97 | 0.06 | 0.07 | 0.57 |
| S'/S | 0.30 | — | 0.21 | 0.27 | 0.26 | 0.28 | 0.19 | — | 0.02 | 0.15 |
| S''/S | 0.03 | — | 0.05 | 0.04 | 0.04 | 0.04 | 0.06 | — | 0.40 | 0.18 |

TABLE 2

(After firing at 1000° C. for 15 hours)

|  | Comp. Ex. 1 | Comp. Ex. 2 | Ex. 1 | Ex. 2 | Ex. 3 | Ex. 4 | Comp. Ex. 3 | Comp. Ex. 4 |
|---|---|---|---|---|---|---|---|---|
| Silica (wt %) | 10.0 | 5.0 | 10.0 | 10.0 | 5.0 | 5.0 | 0 | 5.0 |
| Alumina (wt %) | 90.0 | 95.0 | 90.0 | 90.0 | 95.0 | 95.0 | 100 | 95.0 |
| Specific Surface Area (m²/g) | 235 | 115 | 158 | 173 | 140 | 135 | 109 | 100 |
| Pore Volume (ml/g) | 1.00 | 0.56 | 1.37 | 1.05 | 0.55 | 0.80 | 0.51 | 0.50 |
| Pore Distribution (%) | | | | | | | | |
| 0–40 Å Diameter | 3.1 | 8.0 | 0 | 0.6 | 0 | 0 | 0 | 0 |
| 40–60 Å Diameter | 16.5 | 6.9 | 0.5 | 3.7 | 2.1 | 1.0 | 2.4 | 3.0 |
| 60–80 Å Diameter | 12.6 | 12.0 | 1.3 | 6.8 | 5.0 | 2.3 | 11.7 | 12.0 |
| 80–100 Å Diameter | 10.0 | 26.8 | 2.6 | 8.5 | 9.9 | 2.8 | 31.5 | 30.5 |
| 100–200 Å Diameter | 13.4 | 22.0 | 28.1 | 42.1 | 47.5 | 25.0 | 48.1 | 47.2 |
| 200–400 Å Diameter | 9.8 | 2.8 | 62.8 | 27.8 | 25.5 | 46.2 | 1.7 | 1.5 |
| 400 or larger | 34.6 | 21.5 | 4.7 | 10.5 | 10.0 | 22.7 | 4.6 | 5.8 |
| Volume of 100 Å or larger Diameter Pores / Overall Pore Volume | 57.8 | 46.3 | 95.6 | 80.4 | 83.0 | 93.9 | 54.4 | 54.5 |
| Volume of 100–400 Å Diameter Pores | 0.23 | 0.12 | 0.87 | 0.73 | 0.40 | 0.57 | 0.25 | 0.24 |

TABLE 3

(After firing at 1200° C. for 15 hours)

|  | Comp. Ex. 1 | Comp. Ex. 2 | Ex. 1 | Ex. 2 | Ex. 3 | Ex. 4 | Comp. Ex. 3 | Comp. Ex. 4 |
|---|---|---|---|---|---|---|---|---|
| Silica (wt %) | 10.0 | 5.0 | 10.0 | 10.0 | 5.0 | 5.0 | 0 | 5.0 |
| Alumina (wt %) | 90.0 | 95.0 | 90.0 | 90.0 | 95.0 | 95.0 | 100 | 95.0 |
| Specific Surface Area (m²/g) | 47 | 37 | 73 | 77 | 82 | 65 | 7 | 8 |
| Pore Volume (ml/g) | 0.15 | 0.21 | 0.76 | 0.56 | 0.34 | 0.37 | 0.08 | 0.10 |
| Pore Distribution (%) | | | | | | | | |
| 0–40 Å Diameter | 0 | 1.0 | 0 | 0.9 | 3.2 | 0 | 3.9 | 3.0 |
| 40–60 Å Diameter | 6.1 | 3.8 | 1.6 | 2.7 | 3.3 | 0.1 | 7.6 | 7.2 |
| 60–80 Å Diameter | 9.3 | 6.3 | 1.7 | 3.0 | 2.8 | 0.2 | 4.8 | 5.2 |
| 80–100 Å Diameter | 10.2 | 10.5 | 2.0 | 4.0 | 2.5 | 3.8 | 2.9 | 3.5 |
| 100–200 Å Diameter | 34.1 | 69.4 | 17.1 | 36.2 | 35.8 | 32.3 | 6.3 | 5.8 |
| 200–400 Å Diameter | 23.7 | 4.5 | 53.0 | 40.4 | 40.4 | 47.2 | 7.4 | 8.0 |
| 400 or larger | 16.6 | 4.5 | 24.6 | 12.8 | 12.0 | 16.4 | 67.1 | 67.3 |
| Volume of 100 Å or larger Diameter Pores / Overall Pore Volume | 74.4 | 78.4 | 94.7 | 89.4 | 88.2 | 95.9 | 80.8 | 81.1 |
| Volume of 100–400 Å Diameter Pores | 0.09 | 0.16 | 0.53 | 0.43 | 0.26 | 0.29 | 0.01 | 0.01 |

Of the above-mentioned physical properties, the specific surface area (m²/g) was measured with a BET type specific surface area meter in which a nitrogen gas was used as the absorption gas. The pore distribution was determined by finding an absorption isotherm with Ominisorp manufactured by Omicron Co. Ltd), and performing calculation according to the method of Cranston-Inkley/BJH [Advances in Catalysis, 9, 143 (1970); J. A. C. S. 73, 373 (1951)], using a relative pressure.

Then, heat-resistance estimation was made in terms of the specific surface areas of the above catalyst carriers fired at 1200° C. in air for 15 hours, 100 hours and 300 hours, respectively. The results are set forth in Table 4.

TABLE 4

| Carrier Nos. | 15 hr | 100 hr | 300 hr |
| --- | --- | --- | --- |
| Comparison Example 1 | 47 | 38 | 25 |
| Comparison Example 2 | 37 | 25 | 21 |
| Example 1 | 73 | 72 | 71 |
| Example 2 | 77 | 75 | 74 |
| Example 3 | 82 | 78 | 75 |
| Example 4 | 65 | 64 | 60 |
| Example 5 | 95 | 93 | 90 |
| Comparison Example 3 | 7 | — | 3 |
| Comparison Example 4 | 8 | — | 3 |
| Comparison Example 5 | 20 | — | 9 |

It is to be understood that although Table 4 refers to the results obtained by firing at 1200° C. in air, similar degradation tendencies are presumed to occur at low temperatures of not higher than 1200° C.

EXAMPLE 6

Preparation of Catalysts

The precipitates prepared in Example 1 were filtered out, washed, dried at 120° C. for 20 hours, and pulverized in a ball mill. The product was kneaded with water into a clay, which was then extruded through an extruder equipped with a die having a multiplicity of holes each having a diameter of 1/16 inch to obtain a round rod. Afterward, the rod was dried at 120° C. in air, and was then fired at 500° C. for 3 hours in air to obtain a catalyst carrier.

Commercially available first-grade nitric acid was added to deionized water to prepare a 0.1N aqueous nitric acid solution, and 1.6 g of palladium chloride were added to and heated and dissolved in 1 l of this aqueous solution to prepare a palladium solution.

Twenty (20) ml of said rod-form catalyst carrier were immersed in 25 ml of this solution, wherein palladium was carried on the carrier in an amount of 0.024 g/20 ml by about 2-hour slow stirring. After washing with deionized water, the product was dried at 120° C. for 12 hours in air, and was further fired at 500° C. for 3 hours in air.

In a similar manner as described above, the compositions obtained in Examples 2-5 and Comparison Examples 1-5 were used as the carriers to be carried thereon with palladium, thereby preparing catalysts.

Activity Tests

A mixture consisting of 1% Co, 4% $O_2$ and the balance being $N_2$ was used as the reaction gas, and was passed under conditions of a space velocity of 30000V/H/V and a reaction tube-heating furnace temperature of 250° C. through a reactor formed of a quartz glass tube having an inner diameter of 12.7 mm (and a volume of 1.9 cm$^3$) and packed therein with each of the catalysts set forth in Table 5. After the inlet of the reactor was increased to a temperature of 250° C. and stabilized at that temperature, gases leaving the outlet of the reactor was analyzed by gas chromatography. It is to be noted that use was made of the catalysts fired at 500° C. for 3 hours, at 1000° C. for 100 hours and at 1200° C. for 100 hours, respectively. The results of Co conversion, as measured, were set forth in Table 5.

TABLE 5

| Carrier Nos. | 500° C./3 hrs | 1000° C./ /100 hrs | 1200° C./ /100 hrs |
| --- | --- | --- | --- |
| Comparison Example 1 | 97 | 72 | 60 |
| Comparison Example 2 | 95 | 70 | 58 |
| Example 1 | 100 | 93 | 85 |
| Example 2 | 100 | 90 | 83 |
| Example 3 | 100 | 88 | 76 |
| Example 4 | 100 | 89 | 76 |
| Example 5 | 100 | 96 | 90 |
| Comparison Example 3 | 95 | 50 | 35 |
| Comparison Example 4 | 96 | 48 | 30 |
| Comparison Example 5 | 97 | 55 | 40 |

From Table 5, it can be seen that the catalysts of the present invention make no appreciable difference in reactivity with the comparison catalyst when subjected to a low-temperature treatment such as three-hour firing at 500° C.; however, they still show a high CO conversion even when subjected to a high-temperature treatment such as firing at 1000° C. and 1200° C.

In order to examine the durability of the catalysts, accelerated durability testing was carried out with the products fired at 1000° C. and 1200° C. According to the accelerated durability testing, each catalyst was placed in an electrical furnace, wherein it was heated at 1000° C. while feeding water vapor therethrough a water/air molar fraction of 0.029, and was retained at that temperature for 200 hours to 500 hours to measure the specific surface area (ml/g) of the catalyst. The catalysts used were obtained with the catalyst carriers prepared in Examples 1 and 3 and Comparison Examples 2 and 3. The results are set forth in Table 6.

TABLE 6

| | 1000° C. with no feeding of water | 1000° C. with feeding of water | |
| --- | --- | --- | --- |
| | 15 hrs | 200 hrs | 500 hrs |
| Comparison Example 2 | 115 | 103 | 96 |
| Example 1 | 158 | 153 | 145 |
| Example 3 | 140 | 132 | 120 |
| Comparison Example 3 | 109 | 6 | 3 |
| Example 5 | 170 | 168 | 165 |

There was also no substantial change in the pore distribution, which means that the catalysts can withstand prolonged operations under high-temperature conditions.

Preferred embodiments of the catalyst carriers of the present invention will now be described.

Figure 4:
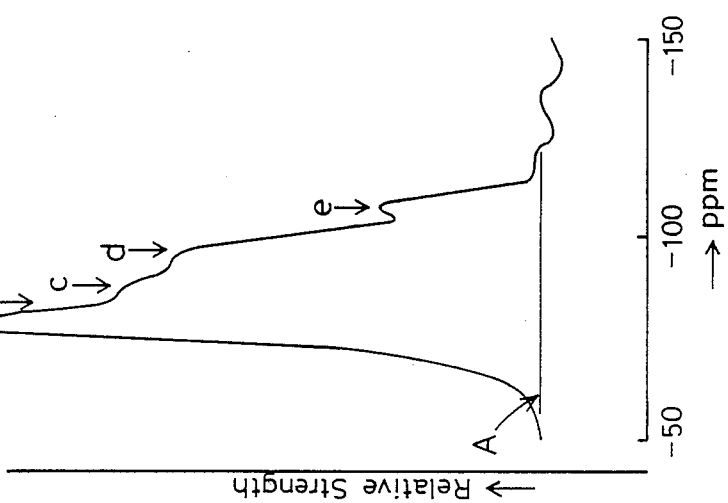
FIG. 4 is a nuclear magnetic resonance diagram, as measured, of the catalyst carrier prepared in Example 1 of the present invention.

Obtained in Example 1 above was the silica-alumina composition (hereinafter referred to as Composition A) including a main peak at a location at which teh aluminium to silicon atomic ratio of a portion having a silica bond formed therein was 4 to 3 and having a silica content of 10% by weight. The results of the $^{29}$Si-NMR measurement of this composition are illustrated in FIG. 4. The measurement was carried out by measuring the $^{29}$Si-nucleus at 53.54 MHz according to the CP/MAS (Cross Polarization/Magic Angle Spinning) method. Silicone rubber was used as the standard substance. From FIG. 4, the following results were obtained.

| Composition A | |
| --- | --- |
| $\dfrac{\text{Area }(-50 \text{ to } -80 \text{ ppm})}{\text{Area }(-50 \text{ to } -130 \text{ ppm})}$ | 0.27 |
| $\dfrac{\text{Area }(-110 \text{ to } -130 \text{ ppm})}{\text{Area }(-50 \text{ to } -130 \text{ ppm})}$ | 0.05 |

Three fired products were also obtained by 15-, 100- and 200-hour firing at 1200° C.

The silica-alumina composition obtained in Example 2 includes a main peak at a location at which the aluminium to silica ratio of a portion having a silica bond formed therein is 4-3, while the composition of Example 3 finds a peak at 4 to 3 and the composition of Example 4 has a main peak at 4 to 3.

The alumina-silica compositions obtained in Examples 1, 2, 3 and 4 Comparison Example 4 were washed with water, dried at 120° C. in air for 12 hours, and were then fired at 500° C. in air for 3 hours to obtain products fired at 500° C.

The $^{29}$Si-NMR measurement was carried out with the 500° C.-fired products in the catalyst carriers prepared as mentioned above. The results are set forth in FIGS. 4 to 7, respectively. On the basis of the results of the NMR measurement, measurement was made of the overall area S defined by the reference line A and the curve as well as the areas s' and s" defined by the absorption strength curves and the reference line A between $-50$ ppm and $-80$ ppm and $-110$ ppm and $-130$ ppm, respectively, and the s'/S and s"/S ratios were calculated.

TABLE 7

|  | Ex. 1 | Ex. 2 | Ex. 5 | Comp. Ex. 4 | Comp. Ex. 5 |
|---|---|---|---|---|---|
| s'/S | 0.27 | 0.27 | 0.19 | 0.02 | 0.15 |
| s"/S | 0.05 | 0.04 | 0.06 | 0.40 | 0.18 |

(The measurement was made using silicone rubber ($-21.9$ ppm) as the reference peak.)

Figure 5:
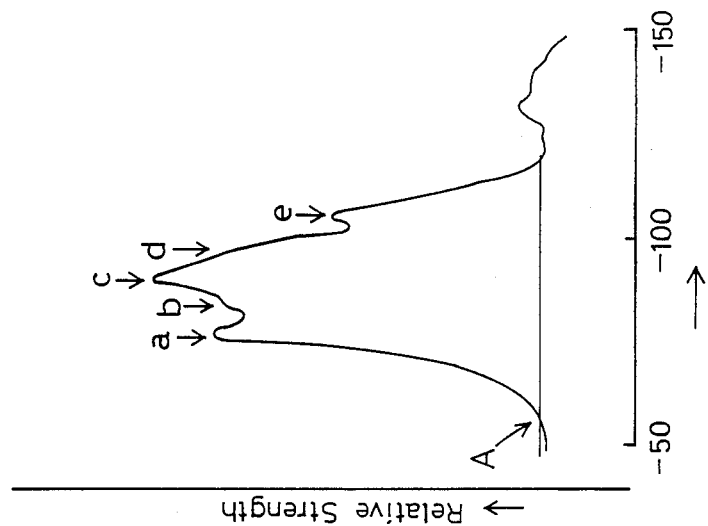
FIG. 5 is a nuclear magnetic resonance diagram, as measured, of the catalyst carrier prepared in Example 5 of the present invention.

It is to be noted that the s'/S and s"/S values are obtained from FIG. 4 for Example 1, from FIG. 5 for Example 5, from FIG. 6 for Comparison Example 4 and from FIG. 7 for Comparison Example 5. It is also to be understood that as regards the s'/S and s"/S of the three fired products prepared by firing at 1200° C., the results obtained were similar to those obtained with the product fired at 500° C.

The relations between the production conditions and the s'/S and s"/S in Examples 3 and 5 are shown below.

EXAMPLE 3 (WITHOUT ANY AGING AGENT)

| pH during the precipitation of alumina hydrogel | pH during aging | s'/S | s"/S |
|---|---|---|---|
| 8 | 6 | 0.26 | 0.04 |
| 8.8 | 6 | 0.30 | 0.03 |

EXAMPLE 5 (WITH THE AGING AGENT)

| pH during the precipitation of alumina hydrogel | pH during aging | s'/S | s"/S |
|---|---|---|---|
| 8 | 6 | 0.19 | 0.06 |
| 8.8 | 6 | 0.21 | 0.05 |

As can be seen from the foregoing, a high specific surface area can be obtained with the catalyst carriers of the present invention in a more preferable range according to the present invention.

Reference will now be made to the catalyst carrier moldings of the present invention.

The catalyst carrier moldings of the present invention are obtained by a first method which involves molding of the silica-alumina compositions prepared when the aforesaid first catalyst carrier was prepared or further forming on the obtained molding a high surface area catalyst carrier layer comprising a silica-alumina composition; a second method which involves molding of a mixture of a ceramic material such as cordierite or mullite with said silica-alumina compositions; and a third method which involves forming a high surface area catalyst carrier layer comprising said silica-alumina compositions on a ceramic molding obtained by molding of cordierite, mullite, etc.

Referring now to the first method, the precipitates composed of silica-alumina mentioned in connection with the preparation of the aforesaid first catalyst carrier are dried and pulverized, if required, to obtain powders, which are then added with water through or not through firing, followed by moisture conditioning and mixing. Alternatively, the precipitates (hydrogel) may be mixed together. The silica-alumina composition may then be finely pulverized and molded with the addition of a binder such as methyl cellulose, polyvinyl alcohol or starch. In order to facilitate molding, however, the powders may be added and mixed with water and an agent for controlling the evaporation of moisture during drying such as, for instance, glycerin or ethylene glycol. If the molding is of the honeycomb shape, then the powders are extruded through an extruder having a grating-form nozzle, then dried and finally fired at 400° C. to 1400° C., preferably 500° C. to 1200° C. in air. Further, the silica-alumina composition may be laminated on the thus obtained molding by wash coating in the manner to be described later.

According to the second method, a finely pulverized ceramic material subjected to a pre-reaction is mixed with the finely pulverized silica-alumina composition prepared in the preparation of the aforesaid first catalyst carrier. As the ceramic materials usable in the present invention, use may be made of any sinterable material capable of affording mechanical and thermal strength to the heat-resistant catalyst carrier moldings. Preference is given to cordierite, mullite, clay, talc, zirconia, zirconia-spinel, alumina, silica, lithium aluminium silicate or alumina-zirconia composite materials.

In the aforesaid ceramic materials, the proportion of the silica-alumina composition is preferably in a range of 30% by weight to 60% by weight. The purpose of using the ceramic material subjected to a pre-reaction is to partly prepare a cordierite crystal structure in advance and, in a later stage, mixing it with the silica-alumina powders, thereby effecting further growth of the cordierite crystals at a relative low temperature (1000° to 1100° C.) in the fired step.

The mixture may then be molded with the addition of a binder such as methyl cellulose, polyvinyl alcohol or starch. In order to facilitate molding, however, the mixture may be added and kneaded with water and an agent for controlling the evaporation of moisture during drying such as, for instance, glycerin or ethylene glycol. If the molding is of the honeycomb shape, then the kneaded product is extruded through an extruder having a grating-form nozzle, then dried and finally fired at 400° C. to 1400° C., preferably 500° C. to 1200° C. in air.

According to the third method, the silica-alumina composition layer in the present invention is formed on a pre-molded ceramic molding of the honeycomb shape by wash coating, as will be described later. Ceramic honeycomb moldings are produced by adding and kneading a binder, water and an agent for controlling the evaporation of moisture, etc. to and with a ceramic material which is to be converted to cordierite upon fired and extruding the kneaded product through an extruder having a grating-form nozzle, followed by drying and firing.

Referring to the wash coating used in the first and third methods, the precipitates of the silica-alumina composition are first dried at 120° C., and are then fired at 500° C. for 5 hours and at 1000° C. for 5 hours to prepare several types of powders for slurrying. Such powders are used in combination. The powders fired at a lower temperature are advantageous in specific surface area over the powders fired at a higher temperature, while the powders fired at a higher temperature is higher than the powders fired at a lower temperature in terms of the degree of progress of sintering and the heat shrinkability-after-sintering of a coating layer is correspondingly reduced so that the coated layer becomes firm and substantially unreleasable.

As regards the particle size of the coating material powders, of importance is that they are finely pulverized to a particle size sufficient to penetrate into 4-micron pores of a cordierite substrate. In other words, it is preferred that the products fired at 500° C. and 1000° C. be reduced to an average particle size of up to $5\mu$, and particles of $1\mu$ to $10\mu$ account for 80% or higher.

For a slurry solvent, on the other hand, a mixed liquid of water with glycerin may be used. Glycerin has an effect upon the control of an evaporation rate of water during drying of the coating layer. The higher the concentration of glycerin, the slower the evaporation of water from the coating layer and the less the difference in the amount of moisture in the deep and surface portions of the coating layer. Thus, a higher concentration of glycerin is effective for the prevention of crazing of the coating layer, which tends to occur in the process of drying. The glycerin to water ratio is suitably in a range of 1/20 to ⅓. It is also preferred that the proportion of glycerin be increased with an increase in the thickness of the coating film formed by one immersion. In addition to water and glycerin, organic binders, surfactants, etc. may be added, including quaternary ammonium silicate, aluminium and phosphates and nitrates of magnesium or alumina sol, silica sol, polyvinyl alcohol and methyl cellulose which are ordinarily used as the binders for slurry particles.

The aforesaid molding is immersed in or sprayed with a slurry comprising the slurrying powders, the slurry solvents, the organic binders and the like to coat it with the silica-alumina composition in the present invention. After excessive deposits have been purged with an inert gas (nitrogen, etc.), the coated molding is dried and fired. Drying is carried out at a temperature ranging from 80° to 200° C., preferably 90° C. to 150° C. in air, and firing is performed by heating to 400° C. to 1400° C., preferably 500° C. to 1200° C. in air. obtained were similar to those obtained with the product fired at 500° C.

It is to be understood that the moldings may be of any one of monolithic shapes such as columnar amd spherical pellet, honeycomb, foam and fiber shapes. Particular preference is given to the honeycomb shape.

When the catalyst carrier moldings are formed into catalysts for combustion, they are prepared by immersing the moldings in a suspension to which are added a mixture of an acid (acetic acid, nitric acid, hydrochloric acid, etc.) or a base (ammonium hydroxide, etc.) with the moldings and/or the hydrogel added thereto in the present invention. When formed into catalysts for the purification of automotive exhaust gases, at least one metal component selected from the group of metals of Periodic Table of Elements, Group VIII, for instance, a ferrous metal component such as iron, nickel or cobalt or a noble metal such as platinum, palladium, iridium, rhodium, ruthenium or osmium is or are carried on the carriers as a catalytically active metal component. Preferably active metal components are at least one selected from the group of platinum, rhodium and iridium. These active metal components in the form of oxides are carried on the carriers in a catalytically effective amount, which is preferably in a range of 0.001% by weight to 5% by weight, particularly 0.005% by weight to 2% by weight.

To and for the silica-alumina compositions in the present invention, one or two or more oxides of an alkaline earth metal such as barium, calcium, strontium, zirconium or magnesium, a metal of Periodic Table of Elements, Group III such as boron, scandium or yttrium, a metal of Periodic Table of Elements, Group IV such as titanium, zirconium or hafnium and a rare earth metal such as lanthanum, cerium or thorium may be added and used. Although the method for their addition is not critical, they may suitably be coprecipitated simultaneously with the preciptation of alumina or silica.

In what follows, the catalyst carrier moldings and the catalysts for combustion using such carriers will be explained with reference to the comparison examples.

EXAMPLE 7

First Method

The precipitates prepared in Example 1 were filtered out, washed with an aqueous solution of ammonium carbonate and dried at 120° C. for 20 hours. Afterwards, one hundred (100) parts by weight of the dried product were fired at 500° C. for 3 hours, and were thereafter pulverized to $3\mu$ to $20\mu$ in a ball mill. The pulverized product was added and kneaded with 5 parts by weight of methyl cellulose, 10 parts by weight of glycerin and 30 parts by weight of water in a screw kneader for 30 minutes to prepare an embryonic clay for extrusion molding.

This product was supplied to a screw type extruder to form a honeycomb structure of 50 mm$\phi \times$ 100 mml including a square grate having a wall thickness of 0.2 mm and one side of 1.8 mm. Then, this structure was very gently dried at 80° C. for 12 hours, then at 100° C. for 24 hours and finally at 120° C. for 24 hours, and was thereafter heated to 500° C. at a heating rate of 60° C./hour, at which temperature it was fired for 3 hours to obtain a honeycomb catalyst carrier molding of the silica-alumina composition.

COMPARISON EXAMPLE

While alumina sol (ASK 110 manufactured by Nishio Kogyo Co., Ltd.) was stirred in a kneader heated to 80° C., colloidal silica (Snowtex manufactured by Nissan Chemical Industries, Ltd.) was added thereto, and an 1N aqueous solution of ammonium carbonate was further slowly added dropwise until a pH of 8.5 was reached. After the completion of dropwise addition, kneading was continued for additional 20 minutes. The product was dried at 120° C. for 12 hours, and pulverized into powders of $10\mu$, which were then fired at 1000° C. for 5 hours and at 1200° C. for 5 hours. The obtained composition was found to contain 10% by weight of silica. Using this composition, a honeycomb catalyst carrier was obtained in a similar manner as described in Example 7.

COMPARISON EXAMPLE 7

Alumina sol (ASK 110 manufactured by Nishio Kogyo Co., Ltd.) and colloidal silica (Snowtex manufactured by Nissan Chemical Industries, Ltd.), both sufficiently dried at 120° C., were independently pulverized and finely divided. Both powders were transferred into a mortar in such a way that an $SiO_2/Al_2O_3$ weight ratio of 10/90 was obtained, wherein they were sufficiently mixed together and dried. After water had been added to the mixture, the mixture was further mixed, and was thereafter dried into a particulate form. Pulverization gave powders of 10μ. The obtained powdery formulation was fired at 1000° C. and 1200° C. each for 5 hours. Using the obtained composition, a honeycomb catalyst carrier was obtained in a similar manner as described in Example.

The products fired at 1200° C. for 15 hours in Example 7 and Comparison Examples 6–7 were measured in terms of the specific surface area ($m^2/g$), pore volume (ml/g) and pore distribution (%) as well as the proportion of pores having a diameter of 100 Å or larger with respect to the overall pore volume and the volume (ml/g) of pores having a diameter of 100 Å to 400 Å. The results are set forth in Table 9 to follow.

TABLE 9

|  | Comp. Ex. 6 | Comp. Ex. 7 | Ex. 7 |
|---|---|---|---|
| Silica (wt %) | 10 | 10 | 10 |
| Alumina (wt %) | 90 | 90 | 90 |
| Specific Surface Area ($m^2/g$) | 25 | 28 | 70 |
| Pore Volume (ml/g) | 0.26 | 0.27 | 0.72 |
| Pore Distribution (%) |  |  |  |
| 0–40 Å Diameter | 3.3 | 2.3 | 0.5 |
| 40–60 Å Diameter | 6.3 | 4.0 | 2.0 |
| 60–80 Å Diameter | 4.3 | 2.4 | 2.3 |
| 80–100 Å Diameter | 3.5 | 1.7 | 3.5 |
| 100–200 Å Diameter | 23.0 | 14.5 | 36.0 |
| 200–400 Å Diameter | 21.2 | 27.4 | 44.8 |
| 400 or larger | 38.3 | 47.8 | 10.9 |
| Volume of 100 Å or larger Diameter Pores / Overall Pore Volume | 82.5 | 89.7 | 91.7 |
| Volume of 100–400 Å Diameter Pores | 0.11 | 0.09 | 0.58 |

Estimation was made of the heat resistance of the aforesaid compositions by measuring their specific surface areas when subjected to 15-, 100- and 300-hour firing at 1200° C. in air. The results are set forth in Table 10 to follow.

Table 10

| Carrier Nos. | 15 hr | 100 hr | 300 hr |
|---|---|---|---|
| Comp. Ex. 6 | 25 | 17 | 9 |
| Comp. Ex. 7 | 28 | 21 | 11 |
| Example 7 | 70 | 56 | 31 |

It is to be appreciated that although Table 10 refers to the results of firing at 1200° C. in air, similar degradation tendencies are presumed to occur even at low temperatures of not higher than 1200° C.

EXAMPLE 8

Second Method

Kaolin, talc and ball clay powders were sufficiently mixed together in the respective amounts of 3.8 kg, 4.0 kg and 1.2 kg by means of a spar floater mixer (manufactured by Kawada, Ltd.) in such a way that the chemical composition of a main component consisted of, on weight basis, 51% silica, 35% alumina and 14% magnesium oxide to formulate a cordierite-forming material. Added to the formulation were 10 parts of methyl cellulose and a suitable amount of ion exchange water, followed by mixing and kneading in a kneader to plasticize the product into an extrusion-moldable state. The product was extruded through a piston type extruder equipped with a nozzle having a multiplicity of holes each of 1.5 mmφ to obtain a round rod, which was then fired in an electrical furance regulated to a temperature of 1300° C. for 4 hours. The fired product was finely divided in a ball mill into cordierite powders subjected to a prereaction and having an average particle size of 10μ.

On the other hand, the precipitates prepared in Example 1 were filtered out, washed with an aqueous solution of ammonium carbonate, and dried at 120° C. for 3 hours. Afterwards, 100 parts by weight of the dried product were fired at 1500° C. for 3 hours, and were thereafter pulverized to 3 to 20 u in a ball mill. Then, four components comprising 3 parts by weight of methyl cellulose, 0.3 parts by weight of stearic acid, 60 parts by weight of cordierite subjected to a pre-reaction and 40 parts by weight of said silica-alumina composition were rotated by a ball mill until they were well mixed together. Afterwards, the mixture was removed from within the ball mill, and was then kneaded with 40 parts by weight of ion exchange water for 30 minutes with the use of a screw kneader to prepare an extrusion-moldable embryonic clay. Then, the clay was supplied to a screw extruder to form a honeycomb shape of 45 mm in diameter and 100 mm in height, having a square cellular structure having a wall thickness of 0.40 mm and a cell density of $100/in^2$.

Then, this honeycomb shape was wrapped with an aluminium foil, and dried at 110° C. for 24 hours by steam. Afterwards, the product was heated to 100° C. at a heating rate of 60° C./hour and then to 1200° C. at a heating rate of 30° C./hour, at which temperature it was further heated to sinter the ceramic material, thereby obtaining a honeycomb catalyst carrier.

COMPARISON EXAMPLE 8

A honeycomb catalyst carrier was obtained in a similar manner as described in Example 8, except that the precipitates of Comp. Ex. 6 were used in place of the precipitates prepared in Example 1.

COMPARISON EXAMPLE 9

A honeycomb catalyst carrier was obtained in a similar manner as described in Example 8, except that the precipitates of Comp. Ex. 6 were used in place of the precipitates prepared in Example 1.

The physical properties of the honeycomb catalyst carriers obtained in this manner and fired at 1200° C. for 15 hours are set forth in Table 11, given just below.

TABLE 11

|  | Porosity | Axial Crushing Strength | Specific Surface Area |
|---|---|---|---|
| Example 8 | 46 | 41 | 201 |
| Comp. Ex. 8 | 47 | 38 | 94 |
| Comp. Ex. 9 | 46 | 42 | 80 |

It is to be noted the porosity is given in %, the axial crushing strength in g/c and the specific surface area in $m^2/g$.

The fired products prepared in these examples and comparison examples were measured in terms of the specific surface area ($m^2/g$), pore volume (ml/g) and pore distribution (%) as well as the proportion of pores having a diameter of 100 Å or larger with respect to the overall pore volume and the volume (ml/g) of pores having a diameter of 100 Å to 400 Å. The results are set forth in Table 12 to follow.

TABLE 12

|  | Comp. Ex. 8 | Comp. Ex. 9 | Ex. 8 |
|---|---|---|---|
| Silica (wt %) | 10 | 10 | 10 |
| Alumina (wt %) | 90 | 90 | 90 |
| Specific Surface Area ($m^2/g$) | 9.4 | 8.0 | 20.1 |
| Pore Volume (ml/g) | 0.22 | 0.23 | 0.40 |
| Pore Distribution (%) |  |  |  |
| 0–40 Å Diameter | 0.3 | 0.8 | 0.2 |
| 40–60 Å Diameter | 1.5 | 1.2 | 0.8 |
| 60–80 Å Diameter | 1.7 | 1.0 | 0.9 |
| 80–100 Å Diameter | 1.6 | 1.3 | 2.2 |
| 100–200 Å Diameter | 9.3 | 6.8 | 15.2 |
| 200–400 Å Diameter | 15.3 | 11.3 | 20.5 |
| 400 or larger | 67.3 | 77.6 | 60.2 |
| Volume of 100 Å or larger Diameter Pores / Overall Pore Volume | 94.9 | 95.7 | 95.9 |
| Volume of 100–400 Å Diameter Pores | 0.05 | 0.04 | 0.14 |

Measurement was made of the specific surface areas of the honeycomb catalyst carriers prepared in Example 8 and Comparison Examples 8 and 9 and fired at 1200° C. for 15 hours, 100 hours, 200 hours and 300 hours. The results are set forth in $m^2/g$ in Table 13.

TABLE 13

| Firing Time | 15 hr | 100 hr | 200 hr | 300 hr |
|---|---|---|---|---|
| Ex. 8 | 20.1 | 16.1 | 14.4 | 13.2 |
| Comp. Ex. 8 | 9.4 | 7.7 | 5.5 | 4.4 |
| Comp. Ex. 9 | 8.0 | 6.5 | 5.8 | 4.7 |

EXAMPLE 9

Third Method

The precipitates prepared in Example 1 were filtered out, washed with an aqueous solution of ammonium carbonate, and dried at 120° C. for 20 hours. Afterwards, the dried product was fired at 950° C. for 5 hours, and was thereafter finely pulverized for 3 hours by an automatic mortar manufactured by Nitto Science Co., Ltd. into coating powders having an average particle size of 10μ. Three hundred (300) g of such powders, 10 g of ammonium nitrate, 40 g of glycerin and 650 g of ion exchange water were mixed and stirred together by a Labo-Stirrer manufactured by Yamato Co., Ltd. for three hours or longer to prepare a slurry.

Then, a honeycomb monolithic carrier (manufactured by NGK Insulators, Ltd., diameter: 150 mm, length: 15 mm, 220.5 g and 0.26 l) formed of cylindrical cordierite having 210 cells per $in^2$ was immersed in water to supply it with water, and was thereafter removed, while the water remaining in the cells was blown off by an air stream.

The honeycomb carrier, to which water had been supplied, was immersed in the previously prepared slurry for 15 minutes, and was then removed therefrom, while an excessive slurry in the cells was blown off by an air stream. The carrier, on which the slurry was carried in this manner, was dried at 130° C. for 5 hours, and was further fired at 1000° C. for 5 hours in air with the use of an electrical furnace to form 18 g of a coating film on the carrier.

COMPARISON EXAMPLE 10

A honeycomb catalyst carrier was obtained in a similar manner as described in Example 9, except that the precipitates of Comp. Ex. 6 were used in place of the precipitates prepared in Example 1.

COMPARISON EXAMPLE 11

A honeycomb catalyst carrier was obtained in a similar manner as described in Example 9, except that the precipitates of Comp. Ex. 6 were used in place of the precipitates prepared in Example 1.

The products fired at 1000° C. for 15 hours in these example and comparison examples were measured in terms of the specific surface area ($m^2/g$), pore volume (ml/g) and pore distribution (%) as well as the proportion of pores having a diameter of 100 Å or larger with respect to the overall pore volume and the volume (ml/g) of pores having a diameter of 100 Å to 400 Å. The results are set forth in the following Table 14.

TABLE 14

|  | Comp. Ex. 10 | Comp. Ex. 11 | Ex. 9 |
|---|---|---|---|
| Silica (wt %) | 10 | 10 | 10 |
| Alumina (wt %) | 90 | 90 | 90 |
| Specific Surface Area ($m^2/g$) | 16 | 17 | 24 |
| Pore Volume (ml/g) | 0.21 | 0.21 | 0.32 |
| Pore Distribution (%) |  |  |  |
| 0–40 Å Diameter | 0.8 | 0.6 | 0 |
| 40–60 Å Diameter | 0.7 | 0.7 | 0.1 |
| 60–80 Å Diameter | 1.4 | 1.7 | 0.2 |
| 80–100 Å Diameter | 2.6 | 2.6 | 0.3 |
| 100–200 Å Diameter | 2.4 | 2.5 | 2.8 |
| 200–400 Å Diameter | 1.5 | 1.6 | 6.3 |
| 400 or larger | 90.6 | 90.3 | 87.6 |
| Volume of 100 Å or larger Diameter Pores / Overall Pore Volume | 94.5 | 94.4 | 96.7 |
| Volume of 100–400 Å Diameter Pores | 0.008 | 0.009 | 0.029 |

Measurement was made with the honeycomb catalyst carriers prepared in Example 9 and Comparison Examples 10 and 11 and fired at 1000° C. for 15 hours, 100 hours, 200 hours and 300 hours by the nitrogen absorption method. The results are set forth in $m^2/g$ in the following Table 15.

TABLE 15

| Firing Time | 15 hr | 100 hr | 200 hr | 300 hr |
|---|---|---|---|---|
| Ex. 9 | 24 | 21 | 20 | 19 |
| Comp. Ex. 10 | 16 | 12 | 11 | 9 |
| Comp. Ex. 11 | 17 | 13 | 11 | 10 |

EXAMPLE 13

Preparation of Catalysts

The catalyst carrier molding prepared in Example 10 was immersed in an aqueous solution of chloroplatinate in nitric acid ($H_2PtCl_6 \cdot 6H_2O$, 0.47 g/200 ml of 0.1N $HNO_3$) to carry a catalyst metal platinum on the catalyst carrier. Afterwards, the product was dried at 80° C. for 1 hour by warm air, and was further dried at 250° C. for 1 hour. Subsequently, the dried catalyst carrier was immersed in an aqueous solution of rhodium chloride ($RhCl_6 \cdot 3H_2O$, 0.045 g/200 ml of 0.1N $HNO_3$) to carry a catalyst metal rhodium on the carrier, followed by warm air drying at 80° C., thereby obtaining a catalyst A. Quantitative analysis of the noble metals of this catalyst indicated that platinum was contained in 1.0 g/l of catalyst and rhodium in an amount of 0.1 g/l of catalyst.

In a similar manner as mentioned above, the compositions obtained in Examples 8 and 9 and Comparison Examples 6–9 were used as the carriers to be carried thereon with palladium, thereby preparing catalysts.

Activity Tests

A mixture consisting of 1% Co, 4% $O_2$ and the balance being $N_2$ was used as the reaction gas, and was passed under conditions of a space velocity of 30000 V/H/V and a reaction tube-heating furnace temperature of 250° C. through a reactor formed of a quartz glass tube having an inner diameter of 12.7 mm (and a volume of 1.9 cm$^3$) and packed therein with each of the catalysts set forth in Table 16. After the inlet of the reactor was increased to a temperature of 250° C. and stabilized at that temperature, gases leaving the outlet of the reactor was analyzed by gas chromatography. It is to be noted that use was made of the catalysts fired at 500° C. for 3 hours, at 1000° C. for 100 hours and at 1200° C. for 100 hours, respectively. The results of Co conversion, as measured, were set forth in Table 18.

TABLE 16

|  | 500° C./3 hrs | 1200° C./100 hrs |
| --- | --- | --- |
| Example 7 | 100 | 83 |
| Example 8 | 100 | 75 |
| Example 9 | 100 | 80 |
| Comparison Example 6 | 99 | 43 |
| Comparison Example 7 | 99 | 40 |
| Comparison Example 8 | 100 | 68 |
| Comparison Example 9 | 100 | 60 |

From Table 16, it can be seen that the catalysts using the carriers of the present invention make no appreciable difference in reactivity with the comparison catalysts when subjected to a low-temperature treatment such as three-hour firing at 500° C.; however, they still show a high CO conversion even when subjected to a high-temperature treatment such as firing at 1200° C.

In order to examine the durability of the catalysts, accelerated durability testing was carried out with the products fired at 1000° C. and 1200° C. According to the accelerated durability testing, each catalyst was placed in an electrical furnace, wherein it was heated at 1000° C. while feeding water vapor therethrough a water/air molar fraction of 0.029, and was retained at that temperature for 200 hours to 500 hours to measure the specific surface area (ml/g) of the catalysts. The compositions of Examples 8 and 9 were used as the present ones and the compositions of Comparison Examples 9 and 10 as the comparison one to prepare the catalysts. The results are set forth in the following Table 17. There was no substantial change in the pore distribution of the catalyst carrier moldings according to the present invention, which indicates that the present moldings can stand up to prolonged operations under high humidity conditions.

TABLE 17

|  | 1000° C. with no Feeding of water | 1000° C. with feeding of water | |
| --- | --- | --- | --- |
| Retaining Time | 15 hrs | 200 hrs | 500 hrs |
| Example 8 | 20 | 18 | 16 |
| Example 9 | 24 | 23 | 20 |
| Comparison Example 9 | 8 | 3 | 2 |
| Comparison Example 10 | 16 | 8 | 4 |

What is claimed is:

1. A heat-resistant catalyst carrier molding comprising an inorganic oxide which comprises silica and alumina, having:
   a silica content in a range of 2% by weight to 30% by weight,
   an overall pore volume of at least 0.3 ml/g and a volume of pores of 100 Å or larger of at least 60% with respect to said overall pore volume, as determined by measurement of pore distribution according to the nitrogen absorption method; and
   an NMR spectrum having a peak area, measured by the ($^{29}$Si-NMR) method using silicone rubber after firing at 500° C. with air as the reference peak (−21−9 ppm), at −50 ppm to −130 ppm of which peak area 0 to 10% comprises a peak area at −100 ppm to −130 ppm.

2. A catalyst for combustion which comprises:
   a heat-resistant catalyst carrier molding comprising an inorganic oxide which comprises silica and alumina, and in which the silica content is in the range of 2% by weight to 30% by weight, the overall pore volume is at least 0.3 ml/g, the volume of pores of 100 Å or larger is at least 60% with respect to said overall pore volume, as determined by measurement of the pore distribution according to the nitrogen absorption method, and an NMR spectrum having a peak area at −50 ppm to −130 ppm of which 0 to 10% is with respect to a peak area at −100 ppm to −130 ppm, as measured by the nuclear magnetic resonance ($^{29}$Si-NMR) method using silicone rubber (−21.9) as a reference peak after firing at 500° C. in air, and a catalytically active metal component.

3. A heat-resistant catalyst carrier molding, comprising a substrate:
   comprising an inorganic oxide, which comprises silica and alumina having a silica content in the range of 2% by weight to 30% by weight, an overall pore volume of at least 0.3 ml/g, a volume of pores of 100 Å or larger of at least 60% with respect to said overall pore volume, as determined by the measurement of a pore distribution according to the nitrogen absorption method; and
   an NMR spectrum having a peak area, measured by the ($^{29}$Si-NMR) method using silicone rubber after firing at 500° C. with air as the reference peak (−21−9 ppm), at −50 ppm to −130 ppm of which peak area 0 to 10% comprises a peak area at −100 ppm to −130 ppm; and
   a layer comprising said inorganic oxide formed on said substrate.

4. A catalyst for combustion, comprising a substrate comprising:
   a heat-resistant catalyst carrier molding comprising an inorganic oxide which comprises silica and alumina having a silica content in the range of 2% by weight to 30% by weight, an overall pore volume of at least 0.3 ml/g, a volume of pores of 100 Å or larger of at least 60% with respect to said overall pore volume, as determined by the measurement of a pore distribution according to the nitrogen absorption method, and an NMR spectrum having a peak area at −50 ppm to −130 ppm of which 0 to 10% is with respect to a peak area at −100 ppm to −130 ppm, as measured by the nuclear magnetic resonance ($^{29}$Si-NMR) method using silicone rubber (−21.9) as a reference peak after firing at 500° C. in air;
   a layer comprising said inorganic oxide formed on said substrate; and
   a catalytically active metal component.

5. A heat-resistant catalyst carrier molding comprising:
   a sintered ceramic, and
   an inorganic oxide, uniformly dispersed into said sintered ceramic, comprising silica and alumina, having a silica content in a range of 2% by weight to 30% by weight, an overall pore volume of at least 0.3 ml/g, a volume of pores of 100 Å or larger of at least 60% with respect to said overall pore volume, as determined by the measurement of a pore distribution according to the nitrogen absorption method, and an NMR spectrum having a peak area, measured by the ($^{29}$Si-NMR) method using silicone rubber after firing at 500° C. with air as the reference peak (−21−9 ppm), at −50 ppm to −130 ppm of which peak area 0 to 10% comprises a peak area at −100 ppm to −130 ppm.

6. A catalyst for combustion comprising:
   a heat-resistant catalyst carrier molding comprising a sintered ceramic; an inorganic oxide, uniformly dispersed into said sintered ceramic, comprising silica and alumina, having a silica content in the range of 2% by weight to 30% by weight, an overall pore volume of at least 0.3 ml/g, a volume of pores of 100 Å or larger of at least 60% with respect to said overall pore volume, as determined by the measurement of a pore distribution according to the nitrogen absorption method, and an NMR spectrum having a peak area at −50 ppm to −130 ppm of which 0 to 10% is with respect to a peak area at −100 ppm to −130 ppm, as measured by the nuclear magnetic resonance ($^{29}$Si-NMR) method using silicone rubber (−21.9) as a reference peak after firing at 500° C. in air; and a catalytically active metal component.

7. A heat-resistant catalyst carrier molding comprising:
   a sintered ceramic molding substrate; and formed on said substrate, a layer of an inorganic oxide, which comprises silica and alumina having a silica content in the range of 2% by weight to 30% by weight, an overall pore volume of at least 0.3 mlg/, a volume of pores of 100 Å or larger of at least 60% with respect to said overall pore volume, as determined by the measurement of a pore distribution according to the nitrogen absorption method; and an NMR spectrum, measured by the ($^{29}$Si-NMR) method using silicone rubber after firing at 500° C. with air as the reference peak (−21−9 ppm), having a peak area at −50 ppm to −130 ppm of which peak area 0 to 10% comprises a peak area at −100 ppm to −130 ppm.

8. A catalyst for combustion comprising:
   a heat-resistant catalyst carrier molding comprising:
   a sintered ceramic molding substrate, a layer of an inorganic oxide, which comprises silica and alumina having a silica content in the range of 2% by weight to 30% by weight, an overall pore volume of at least 0.3 ml/g, a volume of pores of 100 Å or larger of at least 60% with respect to said overall pore volume, as determined by the measurement of a pore distribution according to the nitrogen absorption method, and an NMR spectrum having a peak area at −50 ppm to −130 ppm of which 0 to 10% is with respect to a peak area at −100 ppm to −130 ppm, as measured by the nuclear magnetic resonance ($^{29}$Si-NMR) method using silicone rubber (−21.9) as a reference peak after firing at 500° C. in air formed on said substrate; and
   a catalytically active metal component.

9. A heat-resistant catalyst carrier molding as claimed in any one of claims 1, 3, 5 or 7, wherein said inorganic oxide has a specific surface area of at least 20 m$^2$/g after firing at 1200° C. in air.

10. A heat-resistant catalyst carrier molding as claimed in claim 9, wherein the volume of pores of said inorganic oxide having a diameter of at least 100 Å is at least 0.20 ml/g.

11. A catalyst for combustion as claimed in any one of claims 2, 4, 6 or 8, which comprises a heat-resistant catalyst carrier wherein said inorganic oxide has a specific surface area of at least 20 m$^2$/g after firing at 1200° C. in air, and a catalytically active metal component.

12. A catalyst for combustion as claimed in claim 11, which comprises: a heat-resistant inorganic oxide having a volume of pores having a diameter ranging from 100 Å to 400 Å in the pore distribution of said inorganic oxide at least 0.20 ml/g; and a catalytically active metal component.

13. A heat-resistant catalyst carrier molding as claimed in claim 1, wherein said inorganic oxide has an NMR spectrum comprising a peak area at −50 ppm to −130 ppm of which is 0 to 25% of the peak area is at −50 ppm to −80 ppm.

14. A catalyst for combustion which comprises a heat-resistant catalyst carrier molding as claimed in claim 13, and a catalytically active metal component.

* * * * *